United States Patent [19]

Griffith

[11] 4,214,636
[45] Jul. 29, 1980

[54] THREE-POINT HITCH ADAPTER

[76] Inventor: Rex R. Griffith, Rte. 2, Seneca, Kans. 66538

[21] Appl. No.: 922,525

[22] Filed: Jul. 7, 1978

[51] Int. Cl.² ............................................ A01B 59/043
[52] U.S. Cl. ...................................... 172/450; 280/488
[58] Field of Search ............... 172/248, 439, 443, 445, 172/447, 449, 450, 451; 280/415 A, 446 A, 456 A, 460 A, 461 A, 474, 488

[56] References Cited

U.S. PATENT DOCUMENTS

| 2,705,648 | 4/1955 | McCleskey | 280/488 |
| 2,742,842 | 4/1956 | Johnson | 172/450 |
| 4,069,874 | 1/1978 | Buck et al. | 172/450 |

FOREIGN PATENT DOCUMENTS

| 85804 | 10/1958 | Denmark | 172/449 |
| P 10790 | 10/1955 | Fed. Rep. of Germany | 172/248 |
| 937381 | 1/1956 | Fed. Rep. of Germany | 172/450 |
| 881695 | 11/1961 | United Kingdom | 172/450 |
| 195739 | 7/1967 | U.S.S.R. | 172/439 |

*Primary Examiner*—Richard T. Stouffer
*Attorney, Agent, or Firm*—Schmidt, Johnson, Hovey & Williams

[57] ABSTRACT

An adapter for mounting an implement on a tractor has a frame to which the implement is attached and which, in turn, it is connected with the vertically swingable stabilizer link of the three-point hitch of the tractor. A crossbar, connected with the two powered, vertically swingable drag links of the three-point hitch, has a pivotal connection with the frame such that they swing relatively. The extent to which the tractor may be turned without turning the implement is limited by stops on the frame engageable with the crossbar. Spring-loaded connections between the frame and the tractor drawbar orient the impelemtn as it is raised by the drag links such as to yieldably hold the implement in its normal position directly trailing the tractor.

3 Claims, 6 Drawing Figures

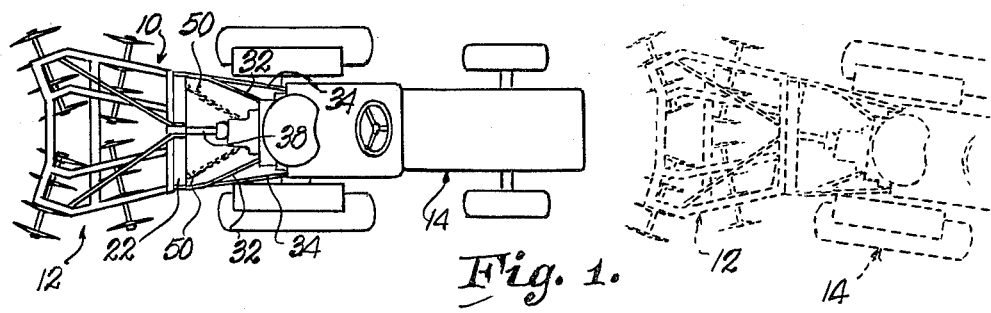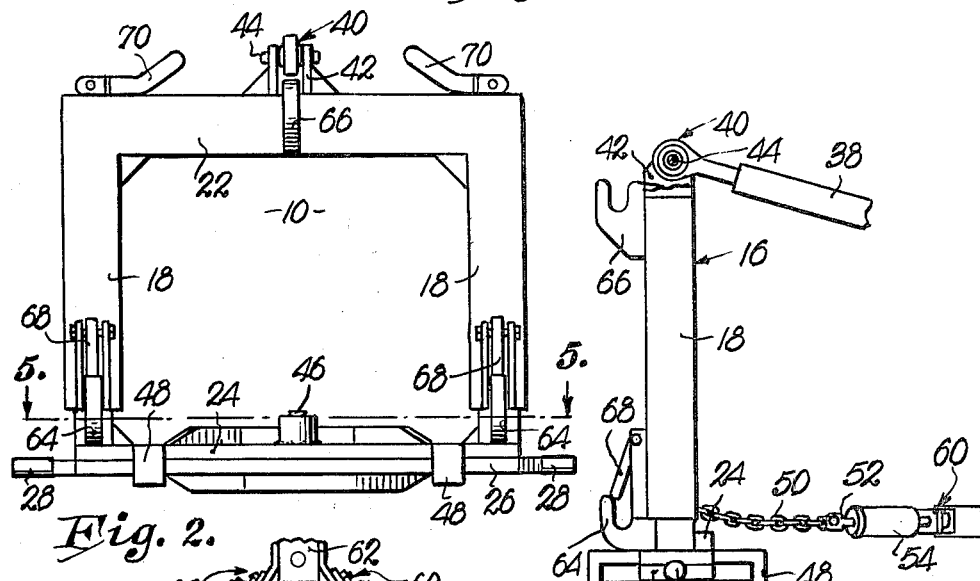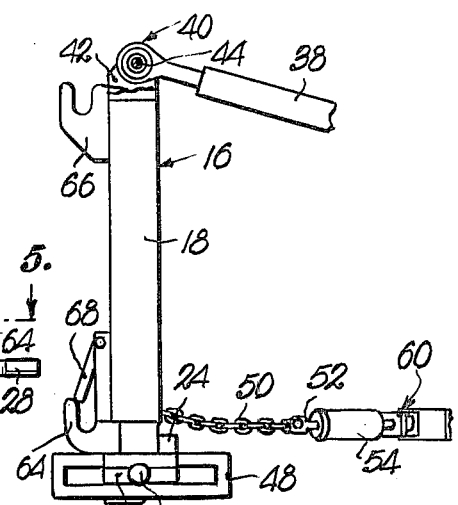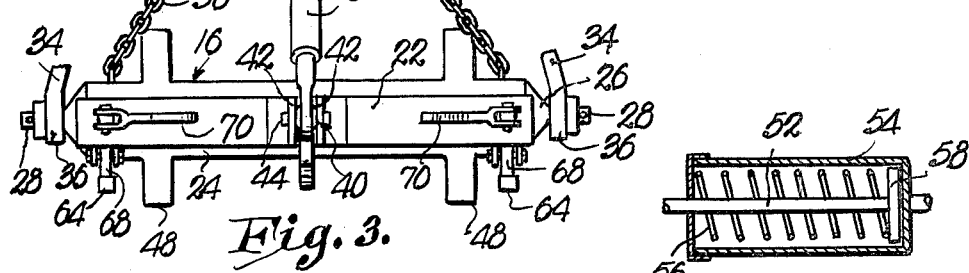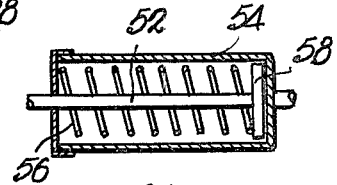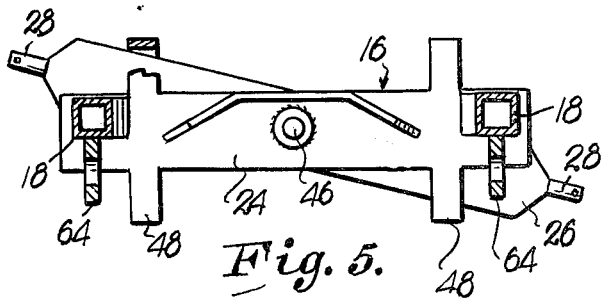

THREE-POINT HITCH ADAPTER

Standard three-point hitches are provided on tractors for use with a wide variety of implements such as plows, cultivators, tillers, box scrapers, hoes, cutters, and post hole diggers. Standard also are adapters connected to the three-point hitch and upon which various implements may, in turn, be easily and quickly mounted such that the implement can be elevated and carried by the tractor through the adapter (such as for over-the-road travel) when the hydraulically powered drag links of the three-point hitch are raised.

The problem lies in lack of flexibility resulting in an inability to make sharp turns with the tractor when the implement is on or in the ground. Turning requires the constant use of the tractor brakes such as to skid, pry, or shore the implement around in the process, and even with such tire manipulation, making it difficult to steer the tractor, it is usually not possible to make a turn on a circle with a radius of much less than 300 feet. Most test fields have contours with much sharper curves. Moreover, with implements becoming progressively larger and heavier, the turning task becomes virtually impossible while the implements are in their lowered positions.

The solution, in accordance with my present invention, is to modify the adapter such as to permit turning of the tractor in either direction within certain limits without impairing turning movement to the implement. By utilizing a crossbar between the drag links, in supporting relation to the frame of the adapter and pivotally connected therewith, the crossbar turns with the tractor without turning the frame upon which the implement is mounted, until such time as the crossbar engages stops on the frame.

As an additional advantage, I have provided connections between the frame and the tractor drawbar, with built-in shock absorbers, for automatically centering the implement as it is being elevated by the hitch, and to hold it so oriented while in the raised position.

In the drawing:

FIG. 1 is a top plan view of a tractor with an implement attached thereto through the use of the three-point hitch adapter made in accordance with my present invention, together with a similar partial view illustrating the relative positions of the tractor and the implement while negotiating a turn;

FIG. 2 is an enlarged rear elevational view of the adapter without the implement being mounted thereon;

FIG. 3 is a top plan view thereof;

FIG. 4 is a side-elevational view thereof;

FIG. 5 is a cross-sectional view taken on line 5—5 of FIG. 2; and

FIG. 6 is enlarged detailed cross-sectional view of one of the shock absorbers.

An adapter 10 for supporting an implement 12 on a tractor 14 includes a frame 16 in the nature of a continuous, polygonal loop, presenting a pair of parallel, horizontally spaced, upright side arms 18, an upper, horizontal crossbeam 22 joining the arms 18 and a lower, horizontal crossbeam 24 joining the arms 18. The crossbeam 24 rests on a crossbar 26 having a pivot pin 28 at each of its ends.

The tractor 14 has a drawbar 30 and a three-point hitch of the kind which includes a pair of horizontally spaced drag links 34 each powered for up and down swinging movement by hydraulic tractor lifts 32. The pins 28 are adapted to receive collars 36 at the rear ends of the links 34. The hitch is also provided with a center, freely swingable, upper stabilizer link 38 having a universal ball joint 40 at its rear end adapted to be received between a pair of upstanding brackets 42 on the crossbeam 22. A pivot pin 44 passes through the joint 40 and the brackets 42.

By virtue of the joint 40 and a pivot pin 46 interconnecting the crossbeam 24 with the crossbar 26, the frame 16 and the crossbar 26 are relatively swingable about an essentially upright axis extending through the joint 40 and the pin 46. A pair of loops 48 on the crossbeam 24 embrace the crossbar 26 to limit the extent of such relative swinging movement.

Each of the arms 18 has a chain 50 attached thereto, and connected with a rod 52 extending into a housing 54. A spring 56 coiled about the rod 52 within the housing 54 is interposed between one end of the housing 54 and a disc 58 on the inner end of the rod 52. the opposite end of the housing 54 is connected by brackets 60 with a sleeve 62 secured to the drawbar 30.

The implement 12 is provided with means of attachment (not shown) with a hook 64 on each of the arms 18 and a third hook 66 centered on the crossbeam 22. The hooks 64 have latches 68 which may be opened by manual operation of locks 70 above the crossbeam 22.

In operation, when the implement 12 is normally towed directly behind the tractor 14, crossbeam 24 is disposed in alignment with the crossbar 26 as shown in FIGS. 2–4, and the chains 50 are slack as seen in FIG. 4. Turning of the tractor 14 causes a corresponding turning movement in the crossbar 26 by virtue of its connection to the drag links 34, but because of the pivot 46 and the universal joint connection 40, no turning movement is imparted from the crossbar 26 to the frame 16. It is only when the crossbeam 24 and the crossbar 26 assume their relative positions shown in FIG. 5, wherein the crossbar 26 engages the stops 48, that the frame 16 and the implement 12 thereon commence to turn by the action of the crossbar 26 imparted to the frame 16. It is now possible with such improvements to execute a circle within a radius of as little as 50 feet without use of the tractor brakes, causing the implement 12 to be pulled around rather than being pried.

When the lifts 32 are used to raise the drag links 34, the distances between the lower ends of the sides 18 and the drawbar 30 increases causing the chains 50 to become taut. As a result, the frame 16 is centered to a position where crossbeam 24 directly overlies the crossbar 26, thereby centering the implement 12 directly behind the tractor 14. The shock of such centering action is removed as the springs 56 compress and the raised implement 12 is held in a proper position during over-the-road or across-the-field travel.

What I claim is:

1. An adapter for supporting an implement on a tractor having a drawbar and a three point hitch wherein the hitch includes a pair of lower, horizontally spaced drag links powered for up and down swinging movement and an upper freely swingable stabilizer link, said adapter including:

a generally horizontal crossbar for pivotally interconnecting the drag links;

a frame supported on the crossbar and extending upwardly therefrom, said frame including a continuous, polygonal loop having a pair of horizontally spaced, upright side arms, an upper horizontal crossbeam joining the arms and a lower horizontal crossbeam joining the arms and a lower horizontal crossbeam joining the arms;

means for mounting said implement on the frame, said mounting means being disposed on the arms and upper crossbeams;

a first pivot means for coupling the stabilizer link with the frame, said first pivot means being midway the ends of the upper crossbeam; and a second pivot means; being crossbeam, interconnecting the crossbar and the frame for rendering the frame swingable relative to the crossbar about an essentially upright axis extending through said first and second pivot means.

2. The invention of claim 1, said lower crossbeam having a pair of horizontally spaced elements embracing the crossbar for limiting the extent of relative swinging movement of the frame and crossbar about said axis.

3. The invention of claim 1 wherein each side arm has a spring-loaded chain connected thereto and adapted for coupling with said drawbar for aligning the crossbar and the lower crossbeam when the drag links raise the adapter and the implement.